United States Patent
Bannister

[11] 3,870,699
[45] Mar. 11, 1975

[54] LINCOMYCIN ANALOGS
[75] Inventor: Brian Bannister, Kalamazoo, Mich.
[73] Assignee: The Upjohn Company, Kalamazoo, Mich.
[22] Filed: Mar. 6, 1973
[21] Appl. No.: 338,459

[52] U.S. Cl. .............................. 260/210 R, 424/180
[51] Int. Cl. .............................................. C07c 47/18
[58] Field of Search ................................. 260/210 R

[56] References Cited
UNITED STATES PATENTS
3,271,385   9/1966   Martin .......................... 260/210 R
3,689,474   9/1972   Kagan et al. .................. 260/210 R
3,702,322   11/1972  Bannister ...................... 260/210 R Primary Examiner—Johnnie R. Brown
Attorney, Agent, or Firm—Joseph T. Eisele; Roman Saliwanchik

[57] ABSTRACT
Compounds of the formula:

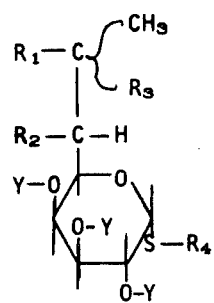

are disclosed, wherein $R_1$ taken independently is hydrogen; $R_2$ taken independently is the moiety

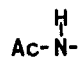

wherein Ac is carboxacyl or an acyl group of formula:

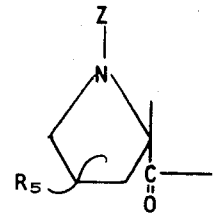

wherein Z is hydrogen, lower alkyl or a protective group removable by hydrogenolysis; $R_5$ is lower alkyl; $R_1$ and $R_2$ when together are the divalent group;

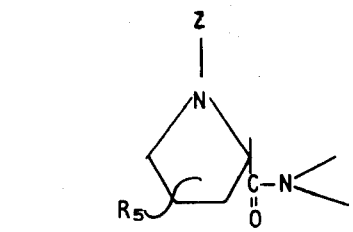

wherein Z and $R_5$ are as defined above; $R_3$ is hydrogen when $R_1$ and $R_2$ are taken together and is a monovalent thio group of formula:

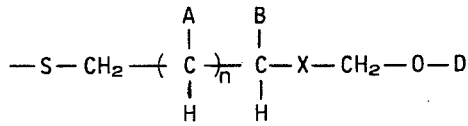

located in the 7(S)-position when $R_1$ and $R_2$ are taken independently, A represents hydrogen or hydroxyl. B represents hydrogen or hydroxyalkyl, $n$ is the integer 0 when B is hydroxyalkyl and $n$ is an integer of 0 to 1, inclusive, when B is hydrogen, X is oxygen or sulfur. D is the acyl radical of a lower hydrocarbon carboxylic acid; $R_4$ is lower alkyl and Y is carboxacyl or hydrogen.

Disclosed also are methods of making and using the novel compounds of the invention, which are useful intermediates in the chemical synthesis of useful antibacterial lincomycin analogs. Certain of the compounds of the invention are also active as antibacterial agents.

21 Claims, No Drawings

LINCOMYCIN ANALOGS

BACKGROUND OF THE INVENTION

1. Field of the Invention

The invention concerns α-thiolincosaminide derivatives; their preparation and uses as intermediates in the chemical synthesis of lincomycin analogs. More particularly, the invention concerns novel alkyl N-acyl-6,7-aziridino-6-deamino-7-deoxy-α-thiolincosaminides and novel alkyl 7-deoxy-7(S)-acyloxythioalkyl-α-thiolincosaminides, their preparation and use.

2. Description of the Prior Art 7-0-Alkyl-substituted-α-thiolincosaminides and their preparation from alkyl N-acyl-6,7-aziridino-α-thiolincosaminides are described in U.S. Pat. No. 3,702,322.

Iranian Pat. No. 10,460 of Aug. 15, 1972 (copending U.S. application Ser. No. 237,129; filed Mar. 22, 1972, now Pat. No. 3,790,560) describes alkyl 7-deoxy-7-mercaptoalkylthio-α-thiolincosaminides, their preparation by sulfidolysis of appropriate 6,7-aziridino-6-deamino-7-deoxy-α-thiolincosaminides and their conversion to corresponding lincomycin analogs.

Iranian Pat. No. 10,395 of Aug. 15, 1972 (copending U.S. application Ser. No. 198,990; filed Nov. 15, 1971, now abandoned) discloses alkyl 7-deoxy-α-thiolincosaminides having a variety of substituted thio groups in the 7(S)-position, such as for example, alkylthio, hydroxyalkylthio and acetoxyalkylthio groups. Also disclosed are preparative procedures for such compounds, which comprises sulfidolysis of appropriate 6,7-aziridino-6-deamino-7-deoxy-α-thiolincosaminides and use of the product compounds to prepare lincomycin analogs.

Iranian Pat. No. 10,407 of Aug. 15, 1972 (copending U.S. application Ser. No. 199,046; filed Nov. 15, 1971, now U.S. Pat. No. 3,767,649) discloses in particular the compound methyl N-acetyl-2,3,4-tri-0-acetyl-7(S)-[3-(3-acetoxypropylthio)propylthio]-7-deoxy-α-thiolincosaminide and lincomycin analogs thereof. The patent teaches preparation of the particular compound by addition of trimethylene sulfide to methyl N-acetyl-2,3,4-tri-0-acetyl-6,7-aziridino-6-deamino-7-deoxy-α-thiolincosaminide.

In general, the compounds of the present invention are intermediates for preparing many of the compounds disclosed in the above described Iranian patents. None of the intermediate compounds of my present invention can be prepared by the process set forth in the above described patents.

The process of the invention comprises, broadly, the sulfidolysis of certain alkyl 6,7-aziridino-6-deamino-7-deoxy-α-thiolincosaminide employing a particular class of cyclic sulfur compounds. The products of the process are obtained in very high yields, about twice the yields of sulfidolated products obtained in those processes of Iranian Pat. Nos. 10,395; 10,407 and 10,460, supra.

Since the 7(S)-S-substituted compounds obtained by the process of this invention are quantitatively converted upon hydrolysis to certain of those sulfidolated products of said Iranian Patents, the process of the present invention and the products thereof offer a commercially advantageous means of preparing 7(S)-thiosubstituted lincomycins.

Moreover, the process of the invention provides a method of obtaining intermediate compounds useful for preparing a class of antibacterial agents not previously known, or preparable by previously known methods; i.e., the alkyl N-(L-2-pyrrolidincarboxyacyl)-7-deoxy-7(S)-(acetoxymethoxy)-alkylthio-α-thiolincosaminides, and the alkyl N-(L-2-pyrrolidinecarboxyacyl)-7-deoxy-7(S)-acetoxymethylthio)-alkylthio-α-thiolincosaminides.

Alkyl N-carboxacyl-6,7-aziridino-6-deamino-7-deoxy-α-thiolincosaminides have also been disclosed prior hereto; see for example, U.S. Pat. Nos. 3,671,647 and 3,702,332; Iranian Pat. Nos. 10,395 and 10,460. However, attempts to obtain the alkyl N-(L-2-pyrrolidinecarboxyacyl)-6,7-aziridino-6-deamino-7-deoxy-α-thiolincosaminides of the invention by methods taught in the above references for preparing the N-carboxacyl analogs, i.e., by N-acylation of the aziridino with an L-2-pyrrolidine-carboxylic acid or the corresponding 1-alkyl substituted L-2-pyrrolidinecarboxylic acid have met with failure prior hereto. By the novel process disclosed herein, alkyl N-(1-carbobenzoxy-4-alkyl)-6,7-aziridino-6-deamino-7-deoxy-α-thiolincosaminides are prepared, from which the corresponding useful 1'-hydrogen and 1'-alkyl analogs are obtained.

SUMMARY OF THE INVENTION

The invention comprises compounds of the formula:

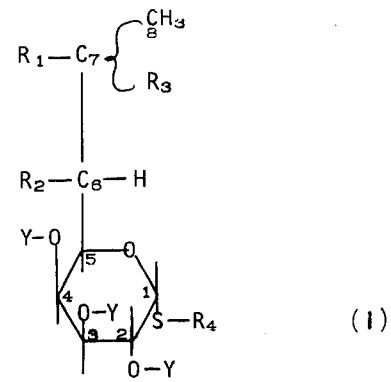

wherein $R_1$ when taken independently represents hydrogen; $R_2$ when taken independently represents the monovalent moiety

wherein Ac is selected from carboxacyl and an acyl radical of formula:

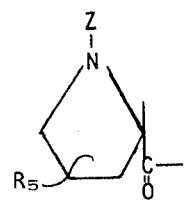

wherein Z is selected from hydrogen, lower alkyl and a protective group removable by hydrogenolysis; $R_5$ is lower alkyl; $R_1$ and $R_2$ when taken together form the divalent moiety of formula:

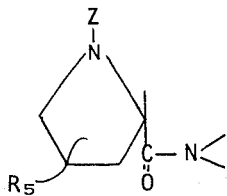

wherein Z and $R_5$ are as defined above: $R_3$ is hydrogen when $R_1$ and $R_2$ are taken together and when $R_1$ and $R_2$ are taken independently, $R_3$ is a monovalent thio group in the 7(S)-position having the formula:

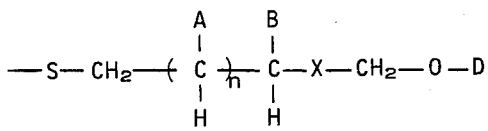

wherein A is selected from hydrogen and hydroxyl, B is selected from hydrogen and hydroxyalkyl, $n$ is the integer 0 when B is hydroxyalkyl and $n$ is an integer of from 0 to 1, inclusive, when B is hydrogen, X is selected from oxygen and sulfur, D is an acyl radical of a lower hydrocarbon carboxylic acid; $R_4$ represents lower alkyl; and Y is selected from carboxacyl and hydrogen.

The wavy line joining $R_5$ to the body of the molecule as shown in formula (I) indicates that the group $R_5$ may be in either the cis (below the plane of the nitrogen-containing ring) or trans (above the plane of the nitrogen-containing ring).

The wavy line joining the methyl group and $R_3$ to the carbon atom at position number 7 in the formula (I) indicates that certain of the compounds (I) exist in both 6(R), 7(R) and 6(R), 7(S) epimeric forms, i.e., those compounds (I) wherein $R_1$ and $R_2$ are taken together have the structure:

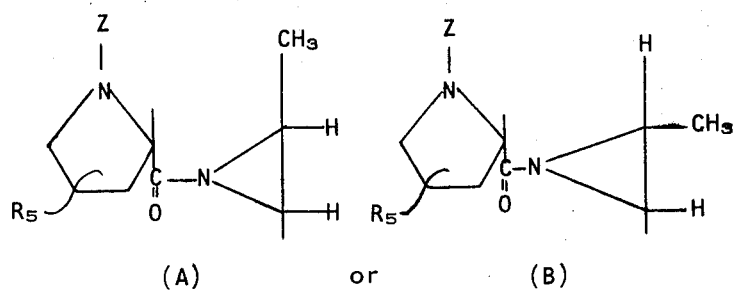

(A)  or  (B)

6(R), 7(R) form    6(R), 7(S) form

The term "carboxacyl" as used throughout the specification and claims means the acyl radical of a hydrocarbon carboxylic acid or of a hydrocarbon carboxylic acid substituted with an inert group. Preferred as carboxacyl groups are the acyl radicals of hydrocarbon carboxylic acids and inert group substituted hydrocarbon carboxylic acids having from 2 to about 18 carbon atoms, inclusive, in their structure. Representative of such carboxacyl groups are those of formula:

wherein E is hydrocarbyl of from 1 to about 17 carbon atoms, inclusive, or hydrocarbyl of from 1 to about 17 carbon atoms, inclusive, wherein a hydrogen atom has been replaced with an inert substituent group. Illustrative of acyl radicals of a hydrocarbon carboxylic acid wherein E is hydrocarbyl are the acyl radicals of (a) saturated or unsaturated, straight or branched chain aliphatic carboxylic acids, for example, acetic, propionic, butyric, isobutyric, tert-butylacetic, valeric, isovaleric, caproic caprylic, decanoic, dodecanoic, lauric, tridecanoic, myristic, pentadecanoic, palmitic, margaric stearic, acrylic, crotonic, undecylenic, oleic, hexynoic, heptynoic, octynoic acids and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropionic acid, and naphthylacetic acid, and the like.

The term "hydrocarbon carboxylic acid substituted with an inert group" is used herein to mean a hydrocarbon carboxylic acid wherein one or more hydrogen atoms attached directly to a carbon atom have been replaced with a group inert to reaction under the conditions hereinafter described for preparing compounds (I) of the invention. Illustrative of such substituent groups are halo-, nitro-, hydroxy-, amino-, cyano-, thiocyano-, or alkoxy-groups. Illustrative of halo-, nitro-, hydroxy-, amino-, cyano-, thiocyano- and alkoxy-substituted hydrocarbon carboxylic acids re mono-, di-, and trichloroacetic acid; α- and β- chloropropionic acid; α- and γ-bromobutyric acid; α- and δ iodovaleric acid; mevalonic acid; 2- and 4-chlorocyclohexanecarboxylic acid; shikimic acid; 2-nitro-1-methylcyclobutanecarboxylic acid; 1,2,3,-4,5,6-hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5,6-dibromo-2- methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo-3,5-dimethylcyclohexanecarboxylic acid; homogentisic acid; o-, m-, and p-chlorobenzoic acid; anisic acid; salicylic acid; p-hydroxybenzoic acid; β-resorcylic acid; gallic acid; veratric acid; trimethoxybenzoic acid; trimethoxycinnamic acid; 4,4'-dichlorobenzilic acid; o-, m-, , and p-nitrobenzoic acid; cyanoacetic acid; 3,4- and 3,5-dinitrobenzoic acids; 2,4,6-trinitrobenzoic acid; thiocyanoacetic acid; cyanopropionic acid; lactic acid; ethoxyformic acid (ethyl hydrogen carbonate); butyloxyformic acid; pentyloxyformic acid; hexyloxyformic acid; dodecyloxyformic acid; hexadecyloxyformic acid and the like.

The term "protective group removable by hydrogenolysis" as used herein means a group inert to acylation but readily removable by hydrogenolysis. Such groups are well known in the art, and are illustrated by trityl, diphenyl-(p-methoxyphenyl)methyl, bis-(p-methoxyphenyl)-phenylmethyl, benzyl, or p-nitrobenzyl and hydrocarbyloxycarbonyl groups. Examples of the latter are tertiary-butoxycarbonyl; benzyloxycarbonyl groups of the formula:

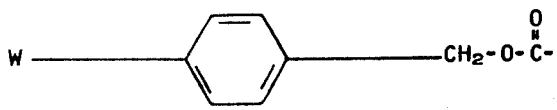

wherein W is hydrogen, nitro, methoxy, chloro, or bromo, for example, carbobenzoxy, p-nitrocarbobenzoxy, p-bromo-, and p-chlorocarbobenzoxy-; and phenyloxycarbonyl groups of the formula:

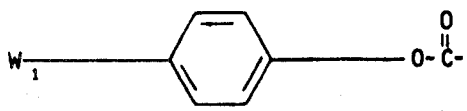

wherein $W_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

The term "lower alkyl" is employed in its usual sense as meaning alkyl of from 1 to about 8 carbon atoms, inclusive, such as methyl, ethyl, propyl, butyl, pentyl, hexyl, heptyl, octyl and isomeric forms thereof.

The term "$R_1$ and $R_2$ when taken together" means $R_1$ and $R_2$ together may constitute a single group, and when so taken will represent the above described divalent moiety having its valencies satisfied by covalent bonds to carbon atoms at positions 6 and 7, respectively, in the formula (I).

The term "hydroxyalkyl" as used herein means alkyl as defined above wherein a hydrogen atom has been replaced by a hydroxyl group. Illustrative of hydroxyalkyl are hydroxyalkyl having from 1 to 6 carbons such as hydroxymethyl, hydroxyethyl, hydroxypropyl, hydroxybutyl, hydroxypentyl and hydroxyhexyl.

The term "acyl radical of a lower hydrocarbon carboxylic acid" means an acyl radical of a hydrocarbon carboxylic acid as defined above, having from 1 to about 8 carbon atoms, inclusive.

One skilled in the art will appreciate that those compounds (I) wherein A or B in the group $R_3$ are other than hydrogen may exist in both D- and L- diastereoisomeric forms. It is to be understood that the formula (I) above includes both the D- and L- diastereoisomers.

Compounds (I) of the invention are useful intermediates in the chemical synthesis of known lincomycin analogs which are antibacterial agents. The invention also comprises methods of preparing and using the compounds (I) of the invention. These methods of preparation and use will be described in greater detail hereinafter.

DETAILED DESCRIPTION OF THE INVENTION

The process of the invention is carried out according to the following procedures.

PROCESS A

Those compounds (I) of the invention wherein Z (if present) is specifically a protective group removable by hydrogenolysis or lower alkyl and $R_3$ is specifically the above described thio group, i.e., A compound of the formula:

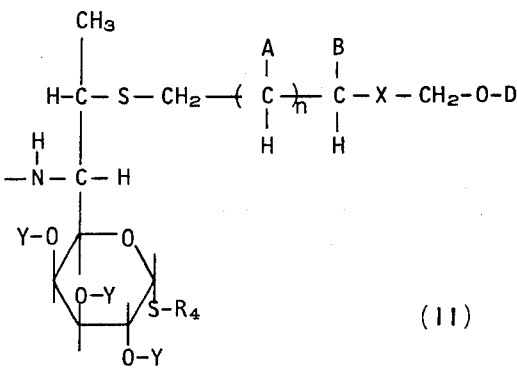

(II)

wherein A, B, X, D, n, $R_4$ and Y are as previously defined; and $Ac_1$ is carboxacyl or an acyl radical of the formula:

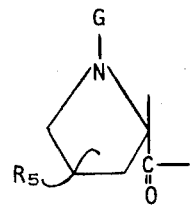

wherein $R_5$ is as defined above and G is a protective group removable by hydrogenolysis or lower alkyl; are readily prepared by bringing together the corresponding alkyl N-acyl-6,7-aziridino-6-deamino-7-deoxy-α-thiolincosaminide (III) with a sulfur compound of the formula:

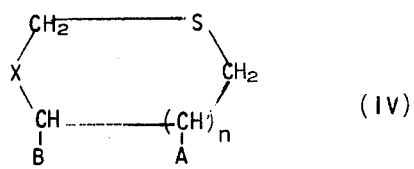

(IV)

wherein A, B, X and n have the meanings previously ascribed to them, and an anhydrous lower hydrocarbon carboxylic acid (V).

The reaction which occurs is conveniently illustrated by the schematic formula:

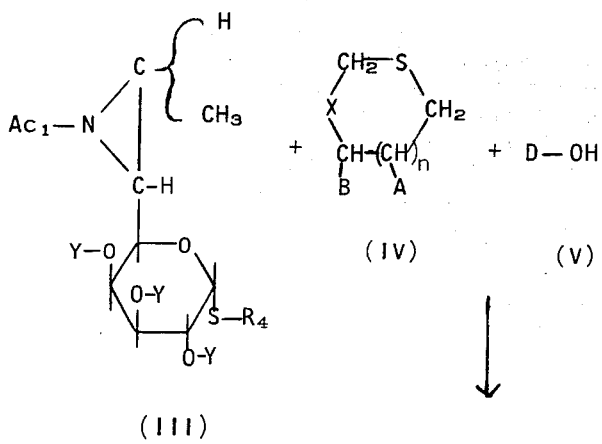

(III)    (IV)    (V)

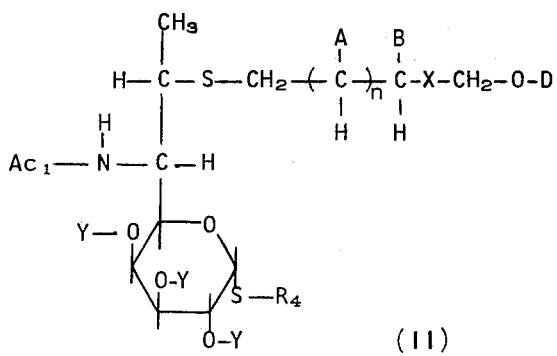

(II)

wherein $Ac_1$, $R_4$, A, B, D, X, Y, n and the wavy lines are as defined above.

As illustrated in the above reaction scheme, the starting alkyl N-acyl-6,7-aziridino-6-deamino-7-deoxy-α-thiolincosaminide (III) starting compound, i.e., a 6(R), 7(R)-form is converted to the corresponding 7(S)-derivative, (i.e., L-threo configuration) as a result of the inversion of the 7(R)-position in the 6(R), 7(R)-form during the course of the reaction.

The compounds (II) of the invention are useful intermediate compounds. Upon removal of acyl groups ($Ac_1$, D or Y when Y is carboxyacyl) by hydrazinolysis, for example, by hydrazinolysis following the procedure set forth in U.S. Pat. No. 3,179,565, there is obtained the corresponding compound of formula:

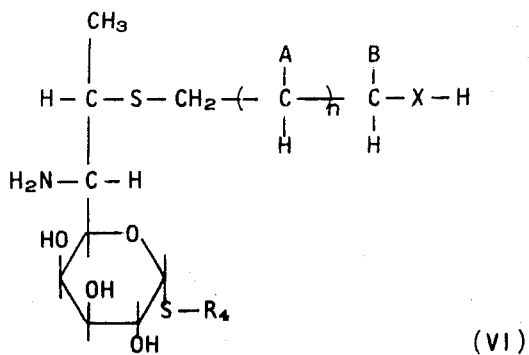

(VI)

wherein A, B, n, X and $R_4$ are as defined above.

The compounds (VI) may be N-acylated with the mixed anhydride of trans-propyl-hygric acid and monoisobutyl carbonate (obtained by reacting trans-propylhygric acid with isobutyl chloroformate) by the method disclosed in U.S. Pat. No. 3,380,992, to obtain the corresponding 7(S)-S-substituted lincomycins. The latter compounds are useful antibacterial agents; see, for example, Iranian Pats. Nos. 10,395 and 10,460, supra.

In carrying out the Process A of the invention as illustrated above, reactants (III), (IV) and (V) are brought together and admixed using conventional apparatus and techniques. The reaction proceeds satisfactorily under a broad range of temperatures conditions, i.e., within a range of from about 25°C. to about 180°C. Preferably, the process of the invention is carried out within a temperature range of from about 60°C. to about 150°C. and most preferably within a temperature range of from about 80°C. to about 110°C. The proportions of reactants (III), (IV) and (V) and not critical to the process reaction, but influence the yields of product compounds (II). The proportions employed may be stoichiometric, i.e., substantially equimolar. Optimum yields are obtained by employing the acid reactant (V) in excess; i.e., in a proportion of at least 2 molar equivalents and preferably within a range of from about 2 to 8 molar equivalents. The sulfar compound (IV) reactant is advantageously employed in excess of stoichiometric requirements, i.e., a molar excess and preferably in a proportion of at least 2 molar equivalents, and most preferably within a range of from about 2 molar equivalents to about 60 molar equivalents.

Advantageously, the above described reaction is carried out in the presence of an inert organic solvent. An inert organic solvent is defined for the purpose of this invention as an organic solvent which will at least partially solubilize the thiolincosaminide reactant (III) and which does not enter into or in any way adversely affect the desired course of the reaction. Illustrative of inert organic solvents are dioxane, carbon tetrachloride, chlorform, methylene chloride, benzene, toluene, n-hexane and like organic solvents. Preferred as the organic solvent is an excess of sulfur compound (IV) i.e., in a proportion beyond that required for the above described reaction, provided said sulfur compound (IV) meets the above criteria for solubilizing reactant (III) at the temperature selected for carrying out the process.

In general, the above described reaction is complete in from about one-quarter to about 24 hours, depending upon the nature of the groups $Ac_1$, A, B, D, X, and Y in the formulae (II) and (III). Completion of the reaction may be ascertained by conventional analytical procedures such as, for example, by vapor-phase chromatography, thin-layer chromatography and like procedures which will indicate the disappearance of starting compounds (III) and the appearance of the desired product compounds (II).

Upon completion of the reaction, the compounds (II) of the invention are readily separated from the reaction mixture by conventional procedures. For example, excess solvent and excess reactants (IV) and (V) are removed by distillation to leave a residue of crude compounds (II). Purified compounds (II) of the invention are separated from the crude residue by well known techniques such as, for example, by counter-current distribution, chromatograpy and solvent extraction techniques followed by crystallization.

The acid reactant starting compounds of formula (V) in anhydrous form as well known compounds. In general they may be characterized by their having an acidity constant of at least about $K_a = 1.7 \times 10^{-5}$. Illustrative of anhydrous lower hydrocarbon carboxylic acids (V) are dry lower alkanoic acids having 2 to 8 carbon atoms, inclusive, such as acetic acid, propionic acid and octanoic acid; arenoic acids having 7 to 8 carbon atoms, inclusive, such as benzoic acid and toluic acid. Preferred as the anhydrous hydrocarbon carboxylic acid is glacial acetic acid.

The sulfur compound reactants of formula (IV) are generally well known compounds as is their preparation. Those compounds (IV) wherein A and B are each hydrogen are the well known compounds 1,3-oxathiolane, 1,3-dithiolane, 1,3-oxathiane and 1,3-dithiane. The hydroxy-substituted dithiane and the hydroxyalkyl-substituted dithiolanes are readily prepared following the method of E. J. Corey, et al., Angewandte Chemie, International Edition (England), 4, 1075, (1965). In general, the method comprises reacting an appropriate hydroxyalkanedithiol with dimethoxymethane in the presence of boron fluoride. Thus, for example, employing 1,3-dimercapto-2-propanol as the starting hydroxy-alkanedithiol, there is obtained 5-hydroxy-1,3-dithiane.

Employing a hydroxyalkanedithiol of formula:

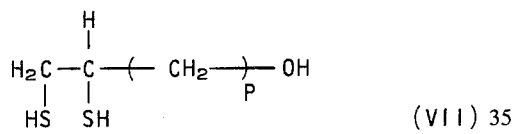

wherein P is an integer of 1 to 6; there is obtained a 4-hydroxyalkyl-1,3-dithiane within the scope of the formula (IV). Illustrative of such 4-hydroxyalkyl-1,3-dithiolanes are 4-hydroxymethyl-1,3-dithiolane, 4-(2-hydroxyethyl)-1,3-dithiolane, 4-(1-methyl-1-hydroxyethyl)-1,3-dithiolane, 4-91,1-dimethyl-2hydroxyethyl)-1,3-dithiolane, 4-(5-hydroxypentyl)-1,3-dithiolane and 4-(6-hydroxyhexyl)-1,3-dithiolane, which are prepared from the appropriate hydroxyalkanedithiols of formula (VII).

Illustrative of the hydroxyalkanedithiols (VII) are 1,2-dimercapto-3-propanol, 1,2-dimercapto-4-butanol, 1,2-dimercapto-3-methyl-4-butanol, 1,2-dimercato-5-pentanol, 1,2-dimercatpo-3,3-dimethyl-4-butanol, 1,2-dimercapto-6-hexanol, 1,2-dimercapto-7-heptanol, and 1,2-dimercapto-8-octanol.

Hydroxy-substituted 1,3-oxathianes and hydroxyalkyl-substituted 1,3-oxathiolanes within formula (IV) above are most conveniently prepared by condensing an appropriate thiol-substituted alkanediol with formaldehyde (paraformaldehyde) in the presence of an acid catalyst such as concentrated hydrochloric acid or p-toluenesulfonic acid. [method of R. M. Roberts, et al., J. Org. Chem., 23 983 (1958)]. Employing as the thiolsubstituted alkanediols compounds of formula:

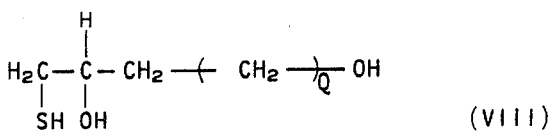

wherein Q is an integer of from 1 to 7, there are obtained the corresponding 5-hydroxyalkyl-1,3-oxathiolanes such as 5-(2-hydroxyethyl)-1,3-oxathiolane, 5-(3-hydroxypropyl)-1,3-oxathiolane, 5-(1,1-dimethyl-2-hydroxyethyl)-1,3-oxathiolane, 5(5-hydroxypentyl)-1,3-oxathiolane, 5-(6-hydroxyhexyl)-1,3-oxathiolane and the like. Compounds (VIII) are well known as illustrated by 1-mercapto-2,4-butanediol, 1-mercapto-2,5-propanediol, 1-mercapto-3,3-dimethyl-2,4-butanediol, 1-mercapto-2,7-heptanediol, 1-mercapto-2,8-octanediol and the like.

Advantageously the sulfur reactant of formula (IV) employed in preparing the novel compounds (I) of the invention is a mixture of substantially equal proportions of 5-hydroxy-1,3-oxathiane and 5-hydroxymethyl-1,3-oxathiolane. Said mixture is obtained by the condensation of 1-mercapto-2,3-propanediol with formaldehyde according to the method of R. M. Roberts, et al., supra, described above.

The use of the mixture of 5-hydroxy-1,3-oxathiane and 5-hydroxymethyl-1,3-oxathiolane as the reactant (IV) in the Process A of the invention is a preferred embodiment resulting in a high yield of a mixture of the corresponding compounds (II) of the invention. The high product yield mixture of compounds (II) so obtained comprises specifically a mixture of the appropriate alkyl N-acyl-2,3,4-tri-O-acyl-7-deoxy-7(S)-(3-acetoxymethoxy-2-hydroxypropylthio)-60-thiolincosamide and alkyl N-acyl-2,3,4-O-acyl-7-deoxy-7(S)-(2-acetoxymethoxy-3-hydroxy-propylthio)-60-thiolincosaminide. The individual components (II) of the above described product mixture may be hydrazinolysed while in admixture, employing conventional techniques, such as the example the hydrazinolysis prcedure set forth in U.S. Pat. No. 671,647, to give quantitative yields of the corresponding alkyl 7(S)-(2,3-di-hydroxypropylthio)-7-deoxy-60 thiolincosaminide. The latter compound is a useful intermediate for preparing the corresponding lincomycin hydrochloride, a useful antibacterial agent; see Iranian Pat. No. 10,395 supra.

The starting aziridino compounds (III) wherein $Ac_1$ is specifically carboxacyl are well known compounds, see for example, U.S. Pat. Nos. 3,671,647; 3,702,322 and Iranian Pat. Nos. 10,395; 10,460.

Those starting aziridino compounds (III) wherein $Ac_1$ is specifically the acyl radical of a 4-alkyl-substituted L-2-pyrrolidinecarboxylic acid, i.e., a compound of the formula:

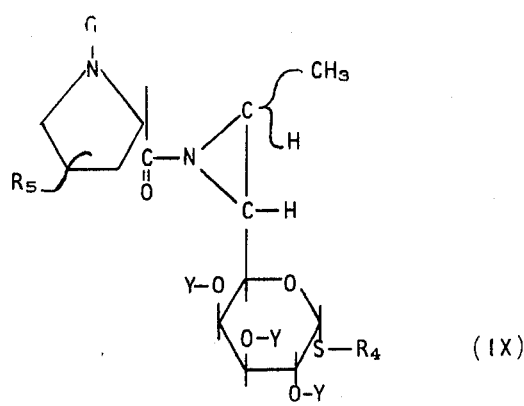

wherein G has the meaning previously given and $R_5$, $R_4$, Y and the wavy lines have the meanings previously assigned to them, are novel compounds within the scope of the formula (I) given above. As demonstrated herein, the novel compounds (IX) are useful in preparing corresponding compounds (II) of the invention, wherein $R_3$ is the described thio group.

PROCESS B

The novel compounds (IX) of the invention are prepared by N-acylating an appropriate alkyl 6,7-aziridino-6-deamino-7-deoxy-α-thiolincosaminide (X) will an appropriate mixed anhydride (XI). The reaction is conveniently illustrated by the schematic formula:

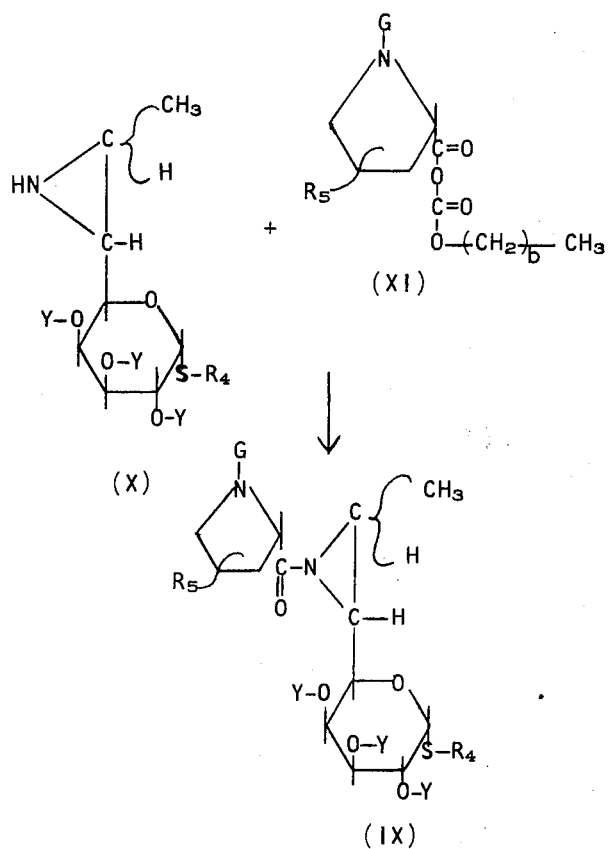

wherein $R_4$, $R_5$, Y, G and the wavy lines have the meanings previously ascribed to them; b is an integer of from 1 to 3.

The process illustrated above is carried out by admixture of the reactants (X) and (XI) in substantially equimolar proportions using conventional apparatus and techniques of mixing. Critical to the process is maintenance of the reaction mixture at a temperature of from about −10°C. to 5°C. during the course of the reaction. The required temperature is maintained by the use of conventional methods of cooling reaction mixtures.

Advantageously, the Process B is carried out in the presence of an inert organic solvent as previously defined. Preferred solvents are acetonitrile, nitromethane, tetrahydrofuran and dimethylformamide and most preferably acetonitrile. Advantageously, the thiolincosaminide reactant (X) is solubilized in an inert organic solvent prior to admixture with mixed anhydride reactant (XI). In this preferred embodiment, the inert solvent employed to dissolve the thiolincosaminide reactant (X) is preferably an aliphatic alcohol having a molecular weight of at least about 60. Illustrative of such aliphatic alcohols are isopropyl alcohol, n-butyl alcohol, isobutyl alcohol, tert-butyl alcohol, n-hexyl alcohol, cyclohexanol and like aliphatic alcohols.

Advantageously, the above reaction is also carried out in the presence of an acid acceptor compound such as, for example, a tertiary amine compound. Illustrative of tertiary amines employed herein are triethylamine, tripropylamine, tributylamine, tripentylamine, trihexylamine and the like.

The process of the above illustrated reaction for preparing compounds (IX) of the invention may be followed by conventional analytical methods such as, for example, thin layer chromatography which will show the appearance of the desired product compounds (IX). In general, the reaction is complete in form about 1 to about 24 hours. Upon completion of the reaction, the desired compounds (IX) are readily separated from the reaction mixture by conventional techniques such as by evaportion of solvent, solvent extaction, chromatography, counter-current distribution and like methods.

The starting thiolincosaminide reactants (X) employed in the above described Process B are well known compounds as is their preparation; see, for example, U.S. Pat. Nos. 3,671,647 and 3,702,322. Mixed anhydride reactants of formula (XI) are for the most part well known, and are prepared by reacting an appropriate L-2-pyrrolidinecarboxylic acid or hydrochloride salt thereof of formula

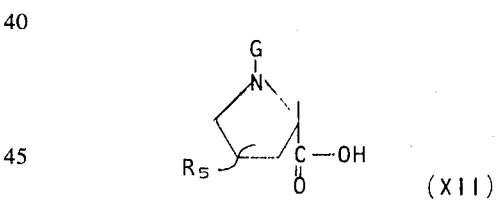

wherein G and $R_5$ are as defined previously, with an appropriate alkyl chloroformate such as, for example, ethyl chloroformate, isopropyl chloroformatae, isobutyl chloroformate and the like. The method of preparing compounds (XI) is well known, and representative details are given, for example, in Example 2, part F-2of U.S. Pat. No. 3,544,551. The starting L-2-pyrrolidinecarboxylic acids of formula (XII) are generally well known; see, for example, U.S. Pat. Nos. 3,475,407 3,544,551 and 3,574,186; copending U.S. application Ser. No. 220,389, filed Jan. 24, 1972, now Pat. No. 3,753,859.

PROCESS C

Specific compounds (I) of the invention wherein $R_3$ is the previously described thio group, and Z represents hydrogen, i.e., compounds of the formula:

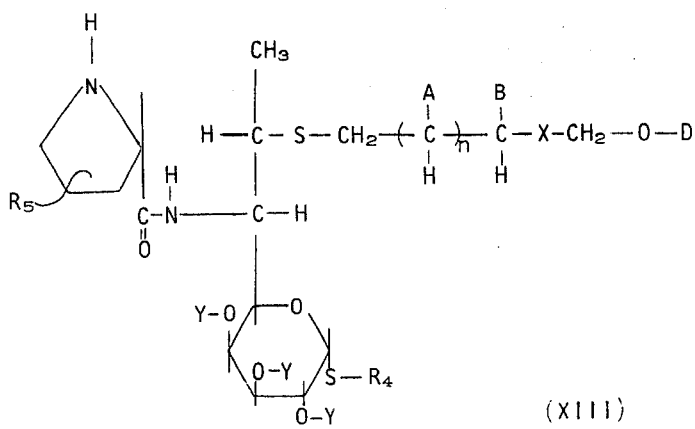

(XIII)

wherein A, B, n X, D, Y, R₄ and R₅ and the wavy line to R₅ are as defined above; are prepared by hydrogenolysis of the corresponding compound (II) wherein Z is specifically a protective group removable by hydrogenolysis. The hydrogenolysis is carried out by known procedures, for example, by the procedure set forth in U.S. Pat. No. 3,380,992. The compounds (XIII) of the invention are useful intermediate compounds. By known methods, for example, as set forth in U.S. Pat. No. 3,366,624, the proline nitrogen in compounds (XIII) may be alkylated by reaction with an alkyl halide. Alternatively, the compounds (XIII) may be reacted with an aldehyde or ketone and the resulting adduct hydrogenated. In this manner, the compounds (X) of the invention provide a method of preparing novel compounds (I) of the invention having the specific formula:

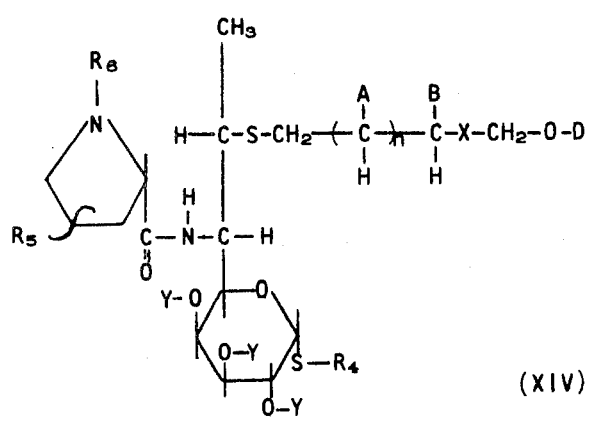

(XIV)

wherein R₆ is lower alkyl, A, B, n, X, D, Y, R₄, R₅ and the wavy line to R₅ are as defined previously.

The compounds (XIV) of the invention wherein Y is specifically carboxacyl are readily hydrolyzed by conventional techniques such as, for example, by base hydrolysis to obtain the corresponding 7-deoxy-7-hydroxyalkylthio lincomycins disclosed in copending U.S. application Ser. No. 199,046, filed Nov. 15, 1971, as useful antibacterial agents.

The compounds (XIV) of the invention wherein Y is specifically hydrogen are preferred compounds (I) of the invention. They are preferred because they possess antibacterial properties similar to, for example, the 7-deoxy-7(S)-alkylthio lincomycins disclosed in Iranian Pat. Nos. 10,395 and 10,460, are useful for the same purposes as said 7-deoxy-7(S)-substituted lincomycins, and are useful in the same manner.

PROCESS D

A preferred process for preparing the compounds (I) of the invention having the specific formula:

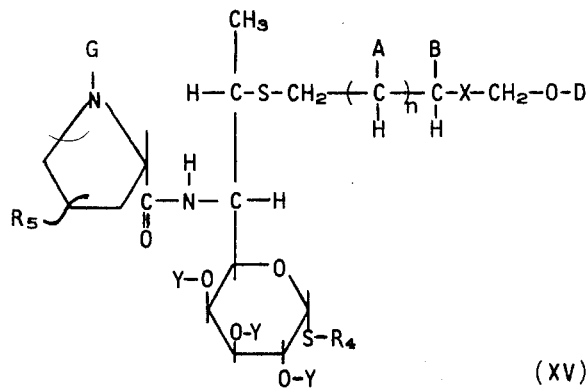

(XV)

wherein A, B, X, R₄, R₅, Y, D, n and the wavy line are as previously defined and G represents lower alkyl or a protective group removable by hydrogenolysis is carried out in a three-step procedure which comprises;

1. reacting together an appropriate aziridine of formula (X), supra. and an appropriate mixed anhydride of formula:

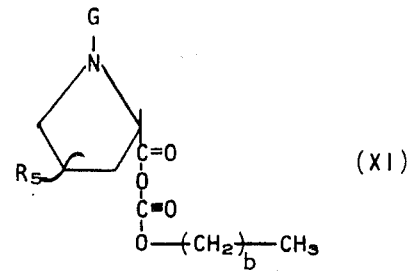

(XI)

wherein G and R₅ are as defined above and b is an integer of from 1 to 3, inclusive; at a temperature of from about −10° C. to about 5°C.; (2.) warming the reaction mixture so obtained to a temperature of from about 25°C. to about 180°C.; and (3.) adding to the warmed reaction mixture an appropriate sulfur compound of formula (IV)

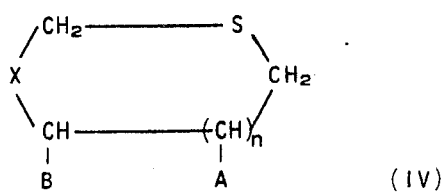

(IV)

15

Details for carrying out the procedure of step (1.) in the above described preferred Process D are those disclosed previously herein as Process B.

Step (2.) of Process D is carried out upon the completion of the reaction occurring in step (1.), but without separating the intermediate compound of formula (IX) from the reaction mixture. Preferably, the warming of the reaction mixture in step (2.) is to a temperature within the range of from about 60°C. to about 150°C. and most preferably within the range of from about 80°C. to about 110°C.

Details of the procedure for carrying out step (2.) of the Process D are those disclosed herein as Process A, which differs only in respect to the specific starting aziridino reactant employed.

The preferred solvents, when employed in Process A differ from those preferred when employed in Process B. AS expected, solvents employed in the various steps of Process D may therefore advantageously differ. In such case a given solvent may be readily stripped and replaced, if desired, by conventional methods well known to one skilled in the art, between consecutive steps of the Process D.

PROCESS E

An alternate and preferred process for the preparation of compounds (XIII) of the invention which were described previously as having the formula:

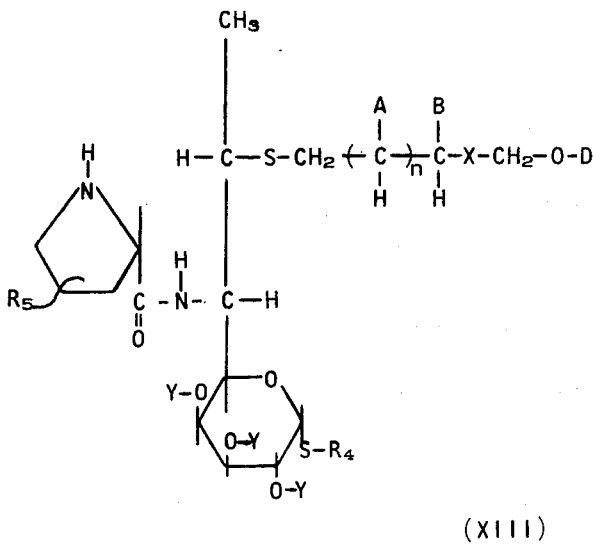

(XIII)

is carried out by modifying the Process D described above, wherein in the mixed anhydride (XI), G is specifically a group removable by hydrogenolysis.

The modification of Process D comprises in step (2.) therein, warming the reaction mixture of step (1.) to a temperature within the range of from about 25°C. to about 50°C. and prior to step (3.) carrying out an intervening step (2A.). Step (2A.) comprises subjecting the warmed reaction mixture obtained in step (2.) to catalytic hydrogenation. The procedure of catalytic hydrogenation is carried out by conventional and well known methods.

In general, such methods comprise adding a catalytic proportion of a hydrogenation catalyst to the reaction mixture and agitating the reaction mixture under a hydrogen gas atmosphere of from 1 to about 50 atmospheres of pressure. The technique is well known; see for example U.S. Pat. No. 3,380,992, Example 2, part (C) for details of such a hydrogenation. Upon completion of the hydrogenation step, which is generally complete in about 3-24 hours, as evidenced by cessation of hydrogen consumption, step (3.) of Process D is commenced. Preferably the hydrogenated mixture is first filtered to remove catalyst residue before proceeding to said step (3.)

The above described Processes D and E are particularly advantageous because they provide a method for the continuous production of the desired compounds (XIII) and (XV) from the basic aziridino (X) without having to isolate the appropriate intermediates which have the formula (IX). This is an important advantage for a number of reasons, for example, certain of the intermediates formed, particularly the alkyl N-(1-alkyl-4-propyl-L-prolyl)-6,7-aziridino-6-deamino-7-deoxy-α-thiolincosaminides and the alkyl N-(L-2-pyrrolidinecarboxacyl)-6-7-aziridino-6-deamino-7-deoxy-α-thiolincosaminides are difficult to separate as pure materials in high yields. The continuous methods of Processes D and E therefore provide in these instances the most practical processes from a commercial viewpoint.

The following preparations and examples describe the manner and process of making and using the invention and set forth the best mode contemplated by the inventor of carrying out the invention but are not to be construed as limiting.

Preparation 1. 5-Hydroxy-1,3-oxathiane and 5-hydroxymethyl-1,3-oxathiolane

A mixture of 200 grams (1 molar equivalent) of 2,3-dihydroxypropanethiol (α-thioglycerol), 55.6 grams (1 molar equivalent) of paraformaldehyde, 1.0 gram of p-toluenesulfphonic acid, and 750 ml. of benzene is heated in an oil-bath at 100°C in a Dean-Stark water-separator apparatus for 12 hours while being continually stirred. At the end of this period, benzene is removed from the reaction mixture by distillation at atmospheric pressure and then under 7 mm. of mercury. The residue is subjected to distillation under high-vacuum, and gives as a residue a colorless liquid, b.p. 66°-67°C. at 0.5 mm. of mercury, which is a mixture of 5-hydroxy-1,3-oxathiane and 5-hydroxy-methyl-1,3-oxathiolane in about equal proportions. Structure of the mixture components is confirmed by vapor phase chromatography and mass spectral analysis. This product mixture was demonstrated to be free of thio starting material by the method of Feigl, "Spot Tests in Organic Analysis," 7th English Ed., (1966), Elsevier Publ. Co., N.Y., N.Y., pps. 219– 220.

Anal. Calcd. for: $C_4H_8O_2S$ (percent): C, 39.98; H, 6.71; S, 26.69.

Found (percent): C, 39,64; H, 6.83; S, 27.07

EXAMPLE 1

Methyl N-[1-carbobenzoxy-trans-4-propyl-L-prolyl]-6(R),7(R)-aziridino-6-deamino-7-deoxy-α-thiolincosaminide.

To a solution of 2.91 grams (1 molar equivalent) of 1-carbobenzoxy-trans-4-propyl-L-proline (prepared by N-carboxylation of trans-4-propyl-L-proline, (prepared according to the method of copending U.S. application Ser. No. 220,389, filed Jan. 24, 1972) in 100 ml. of anhydrous acetonitrile, there is added 1.11 grams of triethylamine (1.53 ml.; 1.1 molar equivalents) with stirring. The stirred solution is cooled to 31 5°C. in an ice-methanol bath. To the resulting mixture 1.36 grams (1.30 ml.; 1 molar equivalent) if isobutyl chloroformate is added and the mixture stirred for 20 minutes while maintaining the temperature at circa −5°C. A precipitate of triethylammonium chloride is formed.

A suspension of 2.35 grams (1 molar equivalent) of methyl 6(R),7(R)-aziridino-6-deamino-7-deoxy-α-thiolincosaminide in 50 ml. of isopropyl alcohol is added to the above mixture, and the mixture allowed to stir without replenishing the coolant. THe aziridine dissolves during the course of circa 10 minutes. The solvent is removed on a rotary evaporator at 40°C. under 7 mm. of mercury and the residue is dissolved in methanol and the solution made basic (circa pH 10) by addition of 6N sodium hydroxide. After about 1 hour, solvent is removed as above and the residue is partitioned between methylene chloride and water. The methylene chloride extract is washed with water and dried over anhydrous sodium sulfate. Removal of the solvent gives an amorphous solid (5.08 grams, 100 percent of theory) of methyl N-[1-carbobenzoxy-trans-4-propyl-L-prolyl]-6(R), 7(R)-aziridino-6-deamino-7-deoxy-α-thiolincosaminide. Structure of the product is confirmed by the infra-red spectrum which shows the 1,700 $cm^{-1}$ absorption of an acylaziridine.

EXAMPLE 2

Methyl N-acetyl-2,3,4-tri-O-acetyl-7-deoxy-7(S)-(2-acetoxymethylthio)-ethylthio-α-thiolincosaminide.

An appropriate reaction vessel is charged with 5.0 grams (1 molar equivalent) of methyl 2,3,4-tri-O-acetyl-6(R), 7(R)-acetylaziridino-6-deamino-7-deoxy-α-thiolincosaminide (prepared according to the method of Example 19, Part 19-A, U.S. Pat. No. 3,671,647), 50 grams of 1,3-dithiolane and 5.25 grams (5.0 ml.; 7 molar equivalents) of glacial acetic acid. The resulting mixture is heated for about twenty hours in an oil bath maintained at a temperature of about 100°C. At the end of this period, the reaction mixture is distilled at a temperature of 100°C. and under pressure of 7 mm. of mercury. The solid residue is partitioned between water and methylene chloride. THe organic layer is separated and washed with saturated aqueous sodium bicarbonate and then with water. The washed solution is dried over anhydrous sodium sulfate. The dried material is counter-current distributed in the system ethanol-water-ethyl acetate-cyclohexane (1:1:1:3,v/v/v/v) to obtain methyl N-acetyl-2,3,4-tri-O-acetyl-7-deoxy-7(S)-(2-acetoxymethylthio)ethylthio-α-thiolincosaminide at a K value of 0.98. Recrystallized from ethyl acetateSkellysolve B[1], there is obtained 5.83 grams (83 percent of theory) of the product in the form of colorless needles, M.P. 164°C. - 165°C., $[\alpha]_D^{25}$ = +167° (C, 0.97, $CHCl_3$).

[1]Essentially n-hexane, B. P. 60°C.–68°C., Skellysolve Oil Co., Inc.

Anal. Calcd. for: $C_{22}H_{35}NO_{10}S_3$ (percent): C, 46.38; H, 6.19; N, 2.46; S, 16.89; M.W., 569

Found (percent): C, 46.07; H, 6.18; N, 2.29; S, 16.85; M.W. (Mass Spec., M+) 569.

Similarly, following the above procedure, but replacing the 1,3-dithiolane as used therein with equal molar proportions of the following sulfur compounds of formula (IV); 1,3-oxathiane, 5-hydroxy-1,3-dithiane, 4-hydroxymethyl-1,3-dithiolane and 4(6hydroxyhexyl)-1,3-dithiolane, respectively, there is obtained methyl N-acetyl-2,3,4-tri-O-acetyl-7-deoxy-7(S)-(3-acetoxymethoxy)propylthio-α-thiolincosaminide, methyl N-acetyl-2,3,4-tri-O-acetyl-7-deoxy-7(S)-(3-acetoxymethylthio-2-hydroxypropylthio)-α-thiolincosaminide, a mixture of methyl N-acetyl-2,3,4-tri-O-acetyl-7-deoxy-7(S)-(2-acetoxymethylthio-3-hydroxypropylthio)-α-thiolincosaminide and methyl N-acetyl-2,3,4-tri-O-acetyl-7-deoxy-7(S)-(3-acetoxymethylthio-1-hydroxypropyl-2-thio)-α-thiolincosaminide and a mixture of methyl N-acetyl-2,3,4-tri-O-acetyl-7-deoxy-7(S)-(2-acetoxymethylthio-8-hydroxyoctylthio)-α-thiolincosaminide and methyl N-acetyl-2,3,4-tri-O-acetyl-7-deoxy-7(S)-(1-acetoxymethylthio-8-hydroxyoctyl-2-thio)-α-thiolincosaminide, respectively. The above isomeric mixtures are readily separated into their isomer component parts by conventional methods, such as by chromatographic techniques, when separation is desired.

EXAMPLE 3

Methyl N-acetyl-2,3,4-tri-O-acetyl-7-deoxy-7(S)-(3-acetoxymethylthio)-propylthio-α-thiolincosaminide.

An appropriate reaction vessel is charged with 5.0 grams (1 molar equivalent) of methyl 2,3,4-tri-O-acetyl-6(R), 7(R)-acetylaziridino-6-deamino-7-deoxy-α-thiolincosaminide (supra.), and 50 grams of 1,3-dithiane. The mixture is heated until molten. To the molten mixture there is added 5.25 grams (5.0 ml., 7 molar equivalents) of glacial acetic acid and the reaction mixture is then stirred while warmed in an oil bath maintained at a temperature of 100°C. for about 20 hours. At the end of this period, the reaction mixture is allowed to cool, methanol (75 ml.) is added and the crystalline 1,3-dithiane which separates (24.5 gm.) is removed by filtration. The filtrate is evaporated to dryness on a rotary evaporator at 40°C. (7 mm. of mercury pressure). The dry residue is chromatographed on silica gel (3 Kg. column, 10.5 cm. × 72 cm.) in ethyl acetate - Skelly-solve-B (supra.) (1:1, v/v) to remove unreacted 1,3-dithiane residues (total eluate 9.5 liters). The eluant is then changed to ethyl acetate to strip the column. An aliquot of the final eluate shows, by thinlayer chromatography, a major material with traces of contaminants of lower $R^f$.

Counter-current distribution of the final eluate in ethanol-water-ethyl acetate-cyclohexane (1:1:1:3, v/v/v/v) gives methyl N-acetyl-2,3,4-tri-O-acetyl-7-deoxy-7-(S)-(3-acetoxymethylthio)propylthio-α-thiolincosaminide at a K value of 1.29. Recrystallization from ethyl acetate-Skellysolve-B (1:1, v/v) gives 4.97 grams (69 percent of theory) of the product in the form of colorless prisms, M.P. 131.5°C. – 132.5°C; $[\alpha]_D^{25}$ = +164° (C. 0.94, $CHCl_3$)

Anal. Calcd. for: $C_{23}H_{37}NO_{10}S_3$ (percent): C, 47.32; H, 6.39; N, 2.40; S, 16.48; M.W. 583

Found (percent): C, 47.49; H, 6.40; N, 2.04; S, 16.20; M.W. (Mass Spec., M+) 583

EXAMPLE 4

Methyl N-acetyl-2,3,4-tri-O-acetyl-7 deoxy-7(S)-(2-acetoxymethoxy)-ethyl-thio-α-lincosaminide.

An appropriate vessel is charged with 5.0 grams (1 molar equivalent) of methyl 2,3,4-tri-O-acetyl-6(R), 7(R)-acetylaziridino-6-deamino-7-deoxy-α-thiolincosaminide (supra.), 50 grams of 1,3-oxathiolane and 5.25 grams (5.0 ml.; 7 molar equivalents) of glacial acetic acid. The resulting mixture is heated for about 20 hours on an oil bath maintained at a temperature of about 100°C. At the end of this period, the reaction mixture is distilled at a temperature of 100°C. and under a pressure of 7 mm. of mercury. The solid residue is partitioned between water and methylene chloride. The organic layer is separated and washed with saturated aqueous sodium bicarbonate and then with water. The washed solution is dried over anhydrous sodium sulfate. The residue obtained from the dried solution by removal of solvent is counter-current distributed in the system ethanol-water-ethyl acetate-cyclohexane (1:1:1:2, v/v/v/v) to obtain methyl N-acetyl-2,3,4-tri-O-acetyl-7-deoxy-7(S)-(2-acetoxymethoxy)ethylthio-α-thiolincosaminide at a K value of 0.70. Recrystallized from ethylacetate-Skellysolve-B (1:1, v/v), 5.7 grams (83 percent of theory) of the product is obtained in the form of colorless needles, M.P. 148°C. − 149°C., $[\alpha]_D^{25} = +158°$ (C, 1.01; $CHCl_3$).

Anal. Calcd. for: $C_{22}H_{35}NO_{11}S_2$ (percent): C, 47.72; H, 6.37; N, 2.53; S, 11,58; M.W. 553

Found (percent): C, 47.91; H, 6.50; N, 2.40; S, 11.37; M.W. (Mass Spec., M$^+$) 553

EXAMPLE 5

Methyl N-acetyl-2,3,4-tri-O-acetyl-7-deoxy-7(S)-(3-acetoxymethoxy-2-hydroxypropyl)thio-α-thiolincosaminide and methyl N-acetyl-2,3,4-tri-O-acetyl-7-deoxy-7(S)-(2-acetoxymethoxy-3-hydroxypropyl)thio-α-thiolincosaminide To 50 grams of the mixture of 5-hydroxy-1,3-oxathiane and 5-hydroxymethyl-1,3-oxathiolane obtained in Preparation 1., supra., there is added with stirring 10.0 grams of methyl 2,3,4-tri-O-acetyl-6(R), 7(R)-acetylaziridino-6-deamino-7-deoxy-α-thiolincosaminide (supra), and 5.25 grams (5.0 ml., 3.5 molar equivalents) of glacial acetic acid. The resulting solution is heated for circa 20 hours in an oil-bath maintained at a temperature of circa 100°C. Volatile material is then removed by distillation at a temperature of 100°C. under a pressure of <1 mm. of mercury. The solid residue is partitioned between water and methylene chloride, and the washed methylene chloride extract dried over anhydrous sodium sulfate. Removal of the solvent gives a solid residue which is subjected to counter-current distribution in the system ethanol-water-ethyl acetate-cyclohexane (1:1:1:0.5, v/v/v/v) to obtain 3.75 grams (52 percent of theory) of a mixture of methyl N-acetyl-2,3,4-tri-O-acetyl-7-deoxy-7(S)-(3-acetoxymethoxy)2-hydroxy-propylthio-α-thiolincosaminide and methyl N-acetyl-2,3,4-tri-O-acetyl-7-deoxy-7(S)-(2-acetoxymethoxy-3-hydroxypropyl)-thio-α-thiolincosaminide at a K value of 1.14. While the materials are present as a well-defined peak, thin-layer chromatography reveals the presence of the two materials in about equal proportions.

EXAMPLE 6

Methyl N-(1-carbobenzoxy-trans-4-propyl-L-prolyl)-7-dexoy-7(S)-(2-acetoxymethoxy)-ethylthio-α-thiolincosaminide, To 5.0 grams of methyl N-(1-carbobenzoxy-trans-4-propyl-L-prolyl)-6-7-aziridino-6-deamino-7-deoxy-α-thiolincosaminide (prepared according to Example 1., supra.) there is admixed 50 grams of 1,3-oxathiolane and 4.2 grams (4.0 ml.; 7 molar equivalents) of glacial acetic acid.

The resulting solution is heated in an oil-bath at 100°C. with magnetic stirring for 20 hours. At the end of this time, thin-layer chromatography (silica gel; methanol-chloroform, 1:7 v/v) of an aliquot of the reaction mixture shows the absence of the starting thiolincosaminide material ($R_f$ 0.51) and the generation of a new zone of product ($R_f$ 0.57). The reaction mixture obtained is chromatographed on silica (1,200 grams, column dimensions 5.8 × 93 cm.). Elution is conducted with the solvent system ethyl acetate-Skellysolve B, 3:1 v/v until 1,500 mls. of eluate has been collected, and then the solvent system is altered to ethyl acetate-Skellysolve B-methanol (3:1:0.2, v/v/v) collecting 50 ml. fractions throughout.

Combination of fractions, Nos. 261–340, inclusive, and removal of the solvent under the standard conditions gives 4.10 grams (63 percent of theory) of methyl N-1-carbobenzoxy-trans-4-propyl-L-prolyl)-7-deoxy-7(S)-(2-acetoxymethoxy)-ethylthio-α-thiolincosaminide in the form of a syrup. Structure of the product is confirmed by nuclear magnetic resonance analysis which shows the characteristic absorption spectra of the substituted side chain, and by infrared analysis which shows a characteristic absorption at 1,740 cm$^{-1}$ and 1,660 cm$^{-1.}$

EXAMPLE 7

Methyl N-(trans-4-propyl-L-prolyl)-7-deoxy-7(S)-(2-acetoxymethoxy)ethylthio-α-thiolincosaminide An appropriate vessel is charged with 2.87 grams of methyl N-(1-carbobenzoxy-trans-4-propyl-L-prolyl)-7-deoxy-7(S)-(2-acetoxymethoxy)ethylthio-α-thiolincosaminide (Example 6, supra) and 1.5 grams of 10 percent palladium on charcoal. The mixture is hydrogenated at an initial pressure of 50 p.s.i. of hydrogen at room temperature for 24 hours. At the end of this period, thin-layer chromatography (silica gel, ethyl acetate-Skellysolve B-methanol, 3:1:0.2 v/v/v) of an aliquot of the reaction mixture shows the absence of the starting carbobenzoxy compound ($R_f$ 0.35) and the presence of a new zone at the origin (i.e., $R_f$ 0.0). Thin-layer chromatography of the reaction solution on silica gel in the solvent system (methanol-chloroform, 1:5 v/v) shows methyl N-(trans-4-propyl-L-prolyl)-7-deoxy-7(S)-(2-acetoxymethoxy)ethylthio-α-thiolincosaminide at $R_f$ 0.42.

The following example illustrates the use of the compounds (II) of the invention as intermediates in the preparation of compounds having known value and usefulness.

EXAMPLE 8

To 3.75 grams of the mixture of methyl N-acetyl-2,3,4-tri-O-acetyl-7-deoxy-7(S)-(2-acetoxymethoxy-3-hydroxypropyl)thio-α-thiolincosaminide and methyl N-acetyl-2,3,4-tri-O-acetyl-7-deoxy-7(S)-(3-acetoxymethoxy-2-hydroxypropyl)-thio-α-thiolincosaminide obtained in Example 5, supra.) there is added 100 grams of hydrazine hydrate. The resulting mixture is heated under gentle reflux in an oil bath maintained at 140°C. for about 22 hours. At the end of this period, excess hydrazine hydrate is distilled under vacuum and the residue crystallized from 10 ml. of methanol-acetonitrile mixture to obtain 2.21 grams (100 percent of theory; 26 percent of theory based on starting methyl N-acetyl-2,3,4-tri-O-acetyl-6(R)-, 7(R)-aziridino-6- deamino-7-deoxy-α-thiolincosaminide) of methyl-7-deoxy-7(S)-(2,3-dihydroxypropylthio)-α-thiolincosaminide, in the form of colorless prisms, M.P. 158°C. to 159°C.

EXAMPLE 9

This Example is not an example of the invention, but follows the procedure of Example 25 in Iranian Pat. 10,395 and by comparison to Examples 5 and 8 herein, shows, the improved product yield obtained by the process of this invention.

A mixture of 5.0 grams (1 molar equivalent) methyl N-acetyl-2,3,4-tri-O-acetyl-6(R), 7(R)-aziridino-6 -deamino-7-deoxy-α-thiolincosaminide, 50 ccs. of 2,3-dihydroxypropyl methyl sulfide, and 5.25 grams (7 molar equivalents) glacial acetic acid is heated in a Pyrex sealed tube for 20 hours in a steam-bath. Volatile materials are removed from the reaction mixture by distillation at 100°C., the residue is dissolved in methylene chloride and stirred with an excess of saturated aqueous sodium bicarbonate. Washing of the organic layer with water, drying over anhydrous sodium sulfate, and removal of the solvent on a rotary evaporator at 40°/7 mm. gives a solid.

Counter-current distribution of this solid in the system 1 ethanol:1 water:1.5 ethyl acetate:0.5 cyclohexane (v/v/v/v) gives 1.02 grams (16.2 percent of theory) of methyl N-acetyl-2,3,4-tri-O-acetyl-7-deoxy-7(S)-(2,3-dihydroxypropyl)thio-α-thiolincosaminide at a K value of 0.91, as colorless platelets from ethyl acetate; m.p. 255°C. - 257°C.

$[\alpha]_D^{25} = +164°$ (C, .67, chloroform)

To 900 mg. of the acylated product so obtained, there is added 100 ml. of hydrazine hydrate. The mixture is stirred and heated under gentle reflux in an oil bath at 160°C. for 22 hours. Removal of the volatile material from the colorless solution by distillation from the oil bath at 110°C./7 mm. gives 600 mg. (circa 100 percent of theory) of methyl 7-deoxy-7(S)-(2,3-dihydroxypropylthio)-α-thiolincosaminide, M.P. 158°C. to 159°C. (overall yield based on starting methyl N-acetyl-2,3,4-tri-O-acetyl-6(R),7(R)-aziridino-6-deamino-7-deoxy-α-thiolincosaminide is circa 16.6 percent of theory).

EXAMPLE 10

Methyl N-(1-methyl-trans-4-propyl-L-prolyl)-6(R),7(R)-aziridino-6-deamino-7-deoxy-α-thiolincosaminide.

1-Methyl-trans-4-propyl-L-proline hydrochloride (4.41 gm., 1 molar equivalent) is suspended in acetonitrile (100 ccs.) with stirring at room temperature, and triethylamine (4.3 gm., 5.9 ml., 2 molar equivalents) is added to the suspension. The resulting solution is then cooled to −5°C. in an ice-methanol bath. A precipitate of triethylammonium chloride appears. Isobutyl chloroformate (2.9 gm., 2.79 ml., 1 molar equivalent) is added to the last mixture at such a rate that the temperature of the reaction mixture remains between −5°C. and 0°C. and the resultant mixture is stirred at a temperature of −5° for an additional 5 minutes. A slurry of 5.0 gm. (1 molar equivalent) of methyl 6(R),7(R)-aziridino-6-deamino-7-deoxy-α-thiolincosaminide in isopropyl alcohol (120 ccs.) is added, and the reaction mixture stirred and allowed to warm to room temperature. After 2 hours, thin-layer chromatography shows the absence of aziridine starting reactant ($R_f$ 0.09) and the appearance of a new zone of $R_f$ 0.31. Removal of volatile solvents on a rotary evaporator at 40° and 7 mm. of mercury give a residual syrup containing methyl N-[1-methyl-trans-4-propyl-L-prolyl]-6(R),7(R)-aziridino-6-deamino-7-deoxy-α-thiolincosaminide.

The latter compound is separated from the syrup residue, when separation is desired, by first dissolving said residue in methylene chloride. The resulting solution is made mildly alkaline, preferably to a pH of circa 8.3 by the addition of aqueous sodium bicarbonate. The resulting mixture is shaken and the organic phase separated. The organic phase, after separation, is washed with water, dried and evaporated to give purified methyl N-(1-methyl-trans-4-propyl-L-prolyl)-6(R),7(R)-aziridino-6-deamino-7-deoxy-α-thiolincosaminide, which is useful as an intermediate for preparing the corresponding lincomycin.

Similarly, following the above procedure but replacing the 1-methyl-trans-4-propyl-L-proline hydrochloride as used therein with an equal molar proportion of 1-n-hexyl-4-propyl-L-proline hydrochloride there is obtained methyl N-(1-n-hexyl-4-propyl-L-prolyl)-6(R),-7(R)-aziridino-6-deamino-7-deoxy-α-thiolincosaminide.

EXAMPLE 11

Methyl N-(1-methyl-trans-4-propyl-L-prolyl)-7-deoxy-7(S)-(2-acetoxymethoxy)-ethylthio-α-thiolincosaminide.

Without separating the methyl N-(1-methyl-trans-4-propyl-L-prolyl)-6(R),7(R)-aziridino-6-deamino-7-deoxy-α-thiolincosaminide from the residual syrup last described in Example 10., supra., said residual syrup is admixed with 65 grams (34 molar equivalents) of 1,3-oxathiolane and the mixture is stirred and heated in an oil-bath at 100°C. until the reaction mixture is a solution. Glacial acetic acid (8.9 gm., 8.5 ml., 7 molar equivalents) is then added to the solution and heating is maintained for 18 hours. At the end of this period, volatile material is removed from the reaction solution by distillation from the oil-bath at 100° under diminished pressure to give a syrupy residue, showing a major product by thin-layer chromatography (silica gel, methanol-chloroform, 1:7 v/v), $R_f$ 0.49, which is methyl N-(1-methyl-trans-4-propyl-L-prolyl)-7-deoxy-7(S)-(2-acetoxymethoxy)-ethylthio-α-thiolincosaminide. The latter compound may be separated from the residue in pure form, when desired, by conventional methods for example by chromatography and counter-current distribution.

Similarly, following the above procedure but replacing the syrup residue containing methyl N-(1-methyl-trans-4-propyl-L-prolyl)-6(R),7(R)-aziridino-6-deamino-7-deoxy-α-thiolincosaminide as used therein with methyl N-(1-n-hexyl-4-propyl-L-prolyl)-6(R),7(R)-aziridino16-deamino-7-deoxy-α-thiolincosaminide, there is obtained methyl N-(1-n-hexyl-4-propyl-L-prolyl)-7-deoxy-7(S)-(2-acetoxymethoxy)-ethylthio-α-thiolincosaminide.

EXAMPLE 12

This example is not an example of the invention but illustrates the hydrolysis of compounds (IX) of the invention to obtain useful antibacterial agents.

Without separating the methyl N-(1-methyl-trans-4-propyl-L-prolyl)-7-deoxy-7(S)-(2-acetoxymethoxy)-ethylthio-α-thiolincosaminide from the syrupy residue last described in Example 11., supra., said syrup residue is dissolved in methanol (50 ml.), adjusted to a pH of about 10 by the addition of aqueous sodium hydroxide (1N), and allowed to stand at room temperature for 1 ½ hours. Methanol is then removed from the alkaline solution on a rotary evaporator at 40°C. under 7 mm. of mercury, and the residual aqueous layer is extracted with chloroform. The extract is dried over anhydrous sodium sulfate. Removal of solvents on a rotary evaporator at 40° under 7 mm. of mercury gives a colorless syrup, (7.69 gm.). Chromatography on silica gel (1,200 gm., column dimensions 5.8 × 91 cm.) is conducted with methanol-methylene chloride, (1:12 v/v) and 50 cc. fractions are collected. Fractions 114–214, inclusive, are pooled and solvent stripped from the combined fractions to give a syrup residue which is 7-deoxy-7(S)-(2-hydroxyethylthio) lincomycin, a useful antibacterial agent; see Iranian Pat. No. 10,407.

EXAMPLE 13

Methyl N-[trans-4-propyl-L-prolyl]-6(R),7(R)-aziridino-6-deamino-7-deoxy-α-thiolincosaminide.

To a solution of 5.08 grams (10 moles) of methyl N-[1-carbobenzoxy-trans-4-propyl-L-prolyl]-6(R),7(R)-aziridino-6-deamino-7-deoxy-α-thiolincosaminide (Example 1, supra.) in 200 ml. of methanol, there is added 0.50 grams of 10% palladium on carbon. The mixture is charged to a Parr low pressure hydrogenation vessel and agitated for about 24 hours under a hydrogen gas atmosphere at a pressure of about 50 psi (gauge); at the end of this period, the reaction mixture is filtered and the solvent removed by evaporation. The residue is a crude mixture containing methyl N-[trans-4-propyl-L-prolyl]-6(R),7(R)-aziridino-6-deamino-7-deoxy-α-thiolincosaminide. When desired, the methyl N-[trans-4-propyl-L-prolyl]-6(R),7(R)-aziridino-6-deamino-7-deoxy-α-thioloicosaminide may be separated from the crude mixture by conventional methods of separation. For example, the mixture may be dissolved in methanol, filtered to remove solid residues, and the filtrate made mildly alkaline, preferably to a pH of circa 8.3 by the addition of base, preferably sodium bicarbonate. The alkaline solution is then evaporated and the residue partitioned between methylene chloride and water. The methylene chloride extract upon washing with water, drying and evaporation of solvent yields methyl N-[trans-4-propyl-L-propyl]-6(R),7(R)-aziridino-6-deamino-7-deoxy-α-thiolincosaminide in purified form.

EXAMPLE 14

Methyl N-(trans-4-propyl-L-prolyl)-7-deoxy-7(S)-(2-acetoxymethoxy)-ethylthio-α-thiolincosaminide.

The crude mixture containing methyl N-(trans-4-propyl-L-prolyl)-6(R),7(R)-aziridino-6-deamino-7-deoxy-α-thiolincosaminide as obtained in Example 13., supra., is admixed with 27.0 grams (300 mmoles) of 1,3-oxathiolane and heated in an oil bath at 100°C. until the mixture is a solution. To the solution there is added 4.2 grams (70 mmoles) of glacial acetic acid and the resulting mixture is stirred for about 18 hours while maintaining the temperature of the reaction mixture at about 100°C. At the end of this period, solvent is stripped from the reaction mixture to obtain a product residue which is crude methyl N-(trans-4-propyl-L-propyl)-7-deoxy-7(S)-(2-acetoxymethoxy)-ethylthio-α-thiolincosaminide.

The product is readily purified by conventional chromatographic methods to give purified methyl N-(trans-4-propyl-L-prolyl)-7-deoxy-7(S)-(2-acetoxymethoxy)-ethylthio-α-thiolincosaminide.

Compounds (I) of the invention having the specific formula:

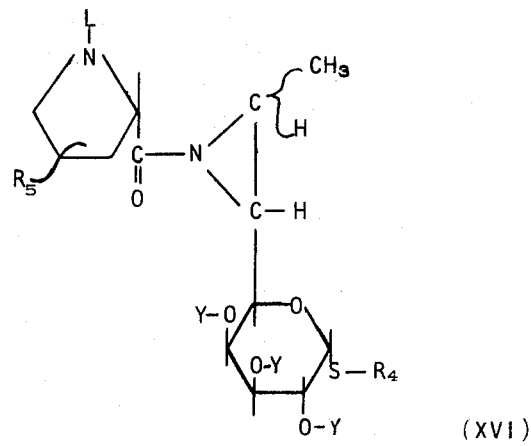

(XVI)

wherein L is selected from hydrogen and lower alkyl, $R_4$ and $R_5$ are each lower alkyl and Y is selected from hydrogen and carboxacyl are particularly valuable intermediates for the synthesis of a wide variety of lincomycin analogs. For example, the compounds (XVI) of the invention may be substituted for alkyl N-acyl-6(R),-7(R)-aziridino-6-deamino-7-deoxy-α-thiolincosaminides in the processes of U.S. Pat. Nos. 3,544,551; 3,671,647; 3,702,322; Iranian Pat. Nos. 10,395; 10,407 and 10,460, supra. Such a substitution yields as a product of said processes, the respective lincomycin analogs, thus obviating the necessity of removing the N-carboxacyl group and replacing it with the N-L-2-pyrrolidinecarboxyacyl group when the lincomycin derivative is the ultimate product desired. This advantage is of particular importance in those instances wherein removal of an N-carboxacyl blocking group may occur concurrently with the undesired removal of an acyl group from another portion of the thiolincosaminide molecule. For example, when in a compound (II) of the invention wherein $Ac_1$ and D are both carboxacyl groups, it may be desirable to replace the $Ac_1$ carboxacyl group with an L-2-pyrrolidinecarboxylic group while retaining the carboxacyl group D. This may be accomplished by employing the appropriate compound (XVI) as the starting reactant (III) in Process A, supra.

I claim:

1. A compound of the formula:

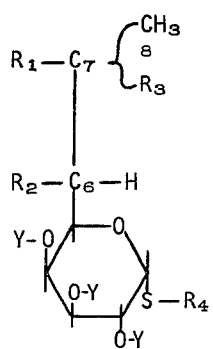

wherein $R_1$ when taken independently represents hydrogen; $R_2$ when takene independently represents the monovalent moiety

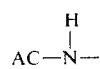

wherein Ac is selected from carboxyacyl of from 2 to 18 carbon atoms, inclusive, and an acyl radical of formula:

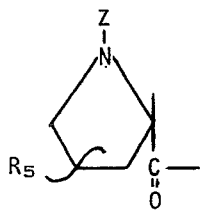

wherein Z is selected from hydrogen, lower alkyl and an amino protecting group removable by hydrogenolysis; $R_5$ is lower alkyl; $R_1$ and $R_2$ when taken together form the divalent group of the formula:

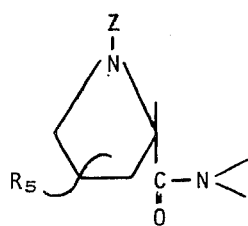

wherein Z and $R_5$ are as defined above; $R_3$ is hydrogen when $R_1$ and $R_2$ are taken together and when $R_1$ and $R_2$ are taken independently, $R_3$ is a monovalent thio group in the 7(S)-position, having the formula:

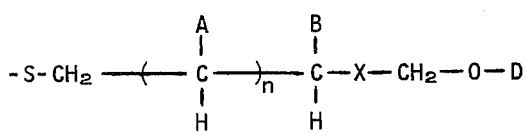

wherein A is selected from hydrogen and hydroxy, B is selected from hydrogen and monohydroxyloweralkyl, n is the integer 0 when B is monohydroxyloweralkyl and an integer of from 0 to 1 when B is hydrogen, X is selected from oxygen and sulfur, D is an acyl radical of a lower hydrocarbon carboxylic acid; $R_4$ represents lower alkyl; and Y is selected from carboxacyl of from 2 to 18 carbon atoms, inclusive, and hydrogen.

2. A compound of the formula:

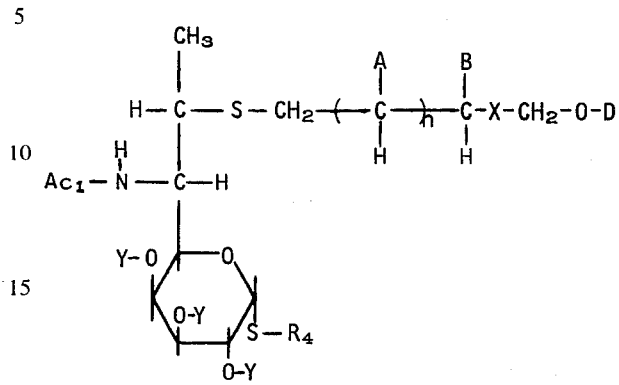

wherein A is selected from hydrogen and hydroxyl; B is selected from hydrogen and monohydroxyloweralkyl; n is the integer 0 when B is monohydroxyloweralkyl and n is an integer of from 0 to 1, inclusive, when B is hydrogen; X is selected from oxygen and sulfur; D is the acyl radical of a lower hydrocarbon carboxylic acid; $Ac_1$ is selected from carboxacyl of from 2 to 18 carbon atoms, inclusive, and an acyl radical of the formula:

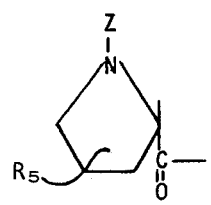

wherein Z is selected from hydrogen, lower alkyl and an amino protecting group removable by hydrogenolysis; and $R_5$ is lower alkyl; $R_4$ represents lower alkyl; and Y is selected from carboxacyl of from 2 to 18 carbon atoms, inclusive, and hydrogen.

3. A process for preparing compounds of the formula:

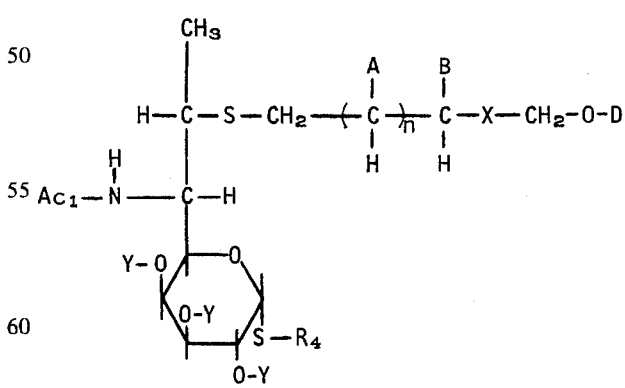

wherein A is selected from hydrogen and hydroxy; B is selected from hydrogen and monohydroxyloweralkyl; n is the integer 0 when B is monohydroxyloweralkyl and n is an integer of from 0 to 1, inclusive, when B is hydrogen; X is selected from oxygen and sulfur; D is the acyl radical of a lower hydrocarbon carboxylic acid; Ac$_1$ is selected from carboxyacyl of from 2 to 18 carbon atoms, inclusive, and an acyl radical of formula:

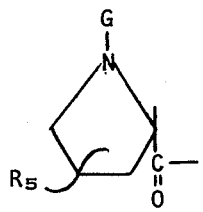

wherein G is selected from lower alkyl and an amino protecting group removable by hydrogenolysis and R$_5$ is lower alkyl; R$_4$ represents lower alkyl; and Y is selected from carboxacyl of from 2 to 18 carbon atoms, inclusive, and hydrogen, which comprises bringing together 1. the corresponding alkyl N-acyl-6,7-aziridino-6-deamino-7-deoxy-α-thiolincosaminide of formula:

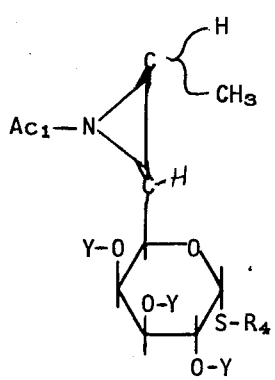

wherein AC$_1$, R$_4$ and Y are as defined above;
2. an anhydrous lower hydrocarbon carboxylic acid; and
3. a corresponding sulfur compound of formula:

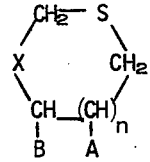

wherein X, A, B, and n are as defined above.

4. A compound of the formulaI:

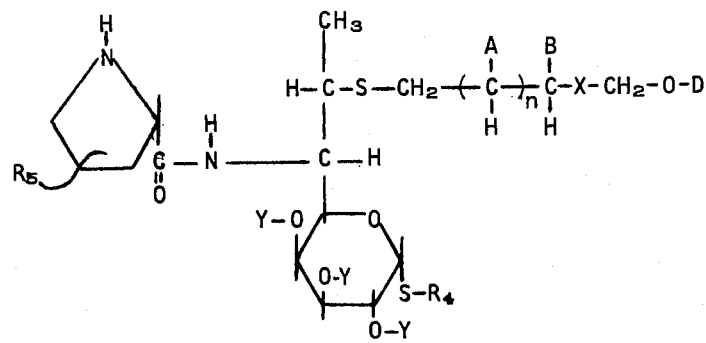

wherein A is selected from hydrogen and hydroxyl; B is selected from hydrogen and monohydroxyloweralkyl; n is the integer 0 when B is monohydroxyloweralkyl and n is an integer of from 0 to 1, inclusive, when B is hydrogen; X is selected from oxygen and sulfur; D is the acyl radical of a lower hydrocarbon carboxylic acid; Y is selected from carboxacyl of from 2 to 18 carbon atoms, inclusive, and hydrogen; R$_4$ and R$_5$ are each lower alkyl.

5. A compound according to claim 4 which is methyl N-(trans-4-propyl-L-prolyl)-7-deoxy-7(S)-(2-acetoxymethoxy)-ethylthio-α-thiolincosaminide.

6. A compound of the formula:

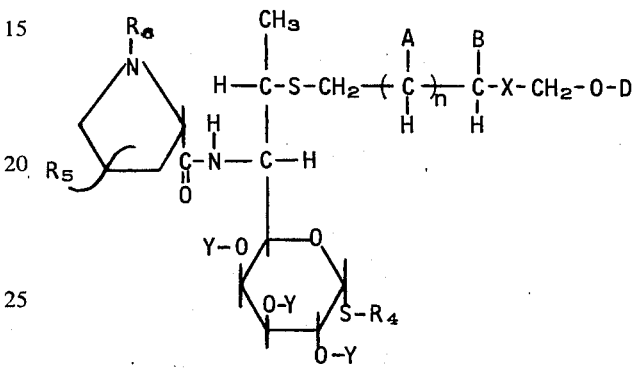

wherein A is selected from hydrogen and hydroxyl; B is selected from hydrogen and monohydroxyloweralkyl; n is the integer 0 when B is monohydroxyloweralkyl and n is an integer of from 0 to 1, inclusive, when B is hydrogen; X is selected from oxygen and sulfur; Y is selected from carboxacyl of from 2 to 18 carbon atoms, inclusive, and hydrogen, R$_4$, R$_5$ and R$_6$ are each lower alkyl.

7. A compound according to claim 6 wherein Y is hydrogen.

8. A compound according to claim 6 which is methyl N-(1-methyl-trans-4-propyl-L-prolyl)-7-deoxy-7(S)-(2-acetoxymethoxy)-ethylthio-α-thiolincosaminide.

9. A compound of the formula:

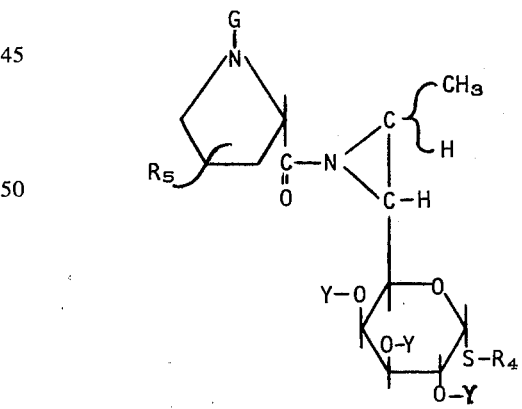

wherein G is selected from lower alkyl and an amino protecting group removable by hyrogenolysis; $R_4$ and $R_5$ each represent lower alkyl and Y is selected from carboxacyl of from 2 to 18 carbon atoms, inclusive, and hydrogen.

10. The compound of claim 9 wherein Y is hydrogen.

11. A compound according to claim 9 which is methyl N-(1-carbobenzoxy-trans-4-propyl-L-prolyl)-6,7-aziridino-6-deamino-7-deoxy-α-thiolincosaminide.

12. A process for preparing compounds of the formula:

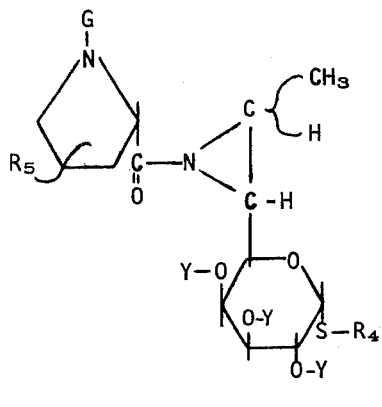

wherein G is selected from lower alkyl and an amino protecting group removable by hydrogenolysis; $R_4$ and $R_5$ are each lower alkyl, Y is selected from carboxacyl of from 2 to 18 carbon atoms, inclusive, and hydrogen which comprises N-acylating a thiolincosaminide compound of formula:

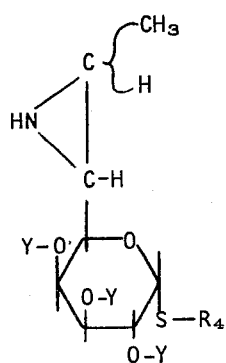

wherein Y and $R_4$ are as defined above; with a mixed anhydride of formula:

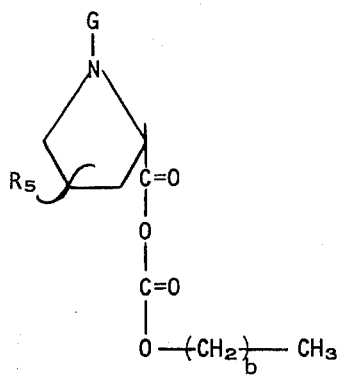

wherein G and $R_5$ are as defined above; b is an integer of from 1 to 3, at a temperature of from about −10°C. to 5°C.

13. A process according to claim 12 wherein said thiolincosaminide is solubilized in an aliphatic alcohol having a molecular weight of at least about 60 prior to N-acylation.

14. A process according to claim 12 wherein said thiolincosaminide compound reactant is methyl 6(R), 7(R)-aziridino-6-deamino-7-deoxy-α-thiolincosaminide, said mixed anhydride in N-[1-carbobenzoxy-trans-4-propyl-L-prolyl]-butylcarbonic anhydride and the product of the process is methyl N-[1-carbobenzoxy-trans-4-propyl-L-proply]-6(R),7(R)-aziridino-6-deamino-7-deoxy-α-thiolincosaminide.

15. A process for preparing compounds of the formula:

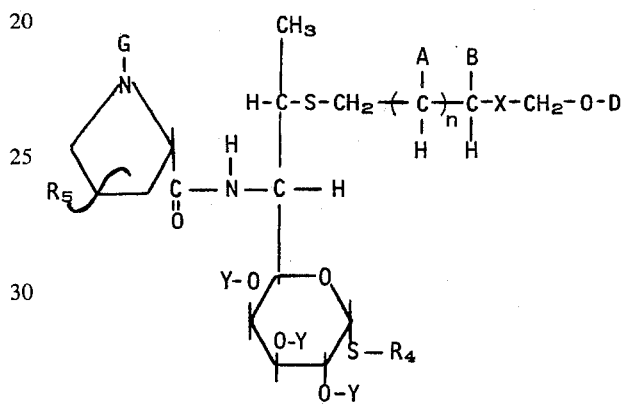

wherein G is selected from lower alkyl and a amino protecting group removable by hydrogenolysis: $R_4$ and $r_5$ are each lower alkyl; Y is selected from hydrogen and carboxacyl of from 2 to 18 carbon atoms, inclusive; A is selected from hydrogen and hydroxyl; B is selected from hydrogen and monohydroxyloweralkyl; $n$ is the integer 0 when B is monohydroxyloweralkyl and $n$ is an integer of from 0 to 1, inclusive, when B is hydrogen; X is selected from oxygen and sulfur; and D is the acyl radical of a lower hydrocarbon carboxylic acid, which comprises:

1. reacting together an appropriate aziridine of formula:

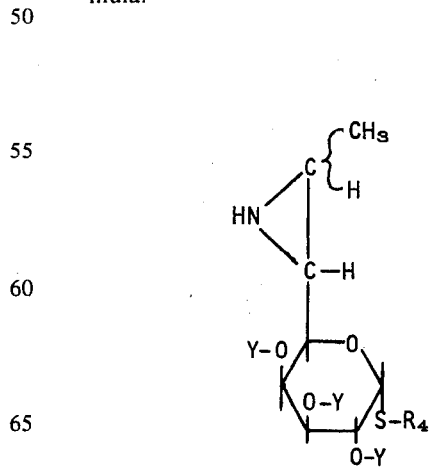

wherein Y and R₄ are as defined above; and an appropriate mixed anhydride of formula:

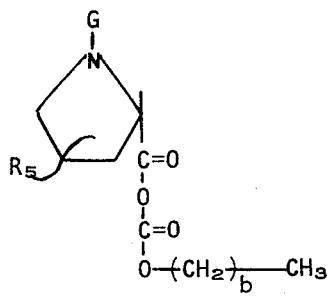

wherein G and R₅ are as previously defined and b is an integer of from 1 to 3, inclusive; at a temperature of from about −10°C. to about 5°C.;
2. warming the reaction mixture so obtained to a temperature of from about 25°C. to about 180°C.; and
3. adding to said warmed reaction mixture (I) an appropriate sulfur compound of the formula:

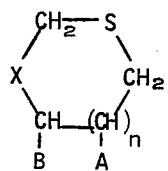

wherein A, B, X and n are as defined above and (II) an anhydrous lower hydrocarbon carboxylic acid.

16. The process of claim 15 wherein methyl 6(R), 7(-R)-aziridino-6-deamino-7-deoxy-α-thiolincosaminide is reacted with N-[1-carbobenzoxy-trans-4-propyl-L-prolyl]-butylcarbonic anhydride in step (1.) and the product thereof is added to 1,3-oxathiolane and acetic acid in step (3.) whereby there is obtained) methyl N-(1-carbobenzoxy-trans-4-propyl-L-prolyl)-7-deoxy-7(S)-(2-acetoxymethoxy)-ethylthio-α-thiolincosaminide.

17. A process for preparing compounds of the formula:

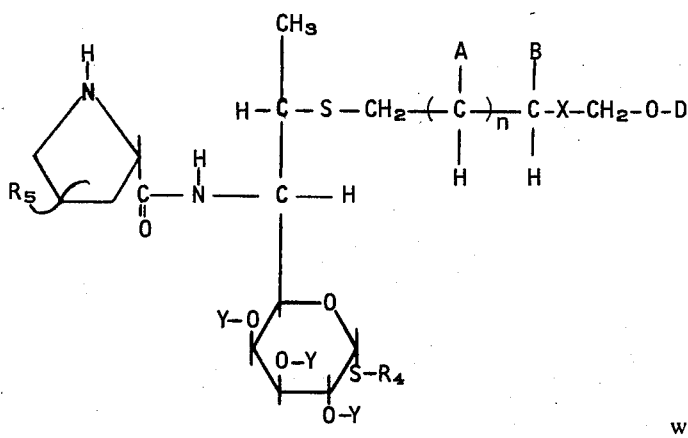

wherein R₄ and R₅ each represent lower alkyl; Y is selected from carboxacyl of from 2 to 18 carbon atoms, inclusive, and hydrogen; A is selected from hydrogen and hydroxyl; B is selected from hydrogen and monohydroxyloweralkyl; n is the integer 0 when B is monohydroxyloweralkyl and n is an integer of from 0 to 1, inclusive, when B is hydrogen; X is selected from oxygen and sulfur; and D is the acyl radical of a lower hydrocarbon carboxylic acid, which comprises:

1. reacting together an appropriate aziridine compound of formula:

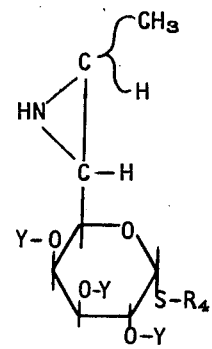

wherein Y and r₄ are as defined above; and an appropriate mixed anhydride of formula:

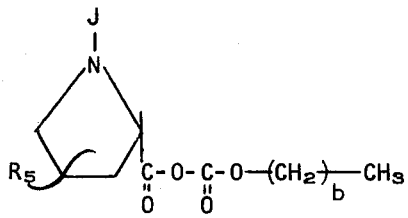

wherein R₅ is as defined above, J is an amino protecting group removable by hydrogenolysis and b is an integer of from 1 to 3, inclusive; at a temperature of from about −10°C. to about 5°C.;
2. warming the reaction mixture so obtained to a temperature of from about 25°C. to about 50°C.;
3. subjecting said warmed reaction mixture to catalytic hydrogenation; and
4. adding to said hydrogenated mixture (I) an appropriate sulfur compound of the formula:

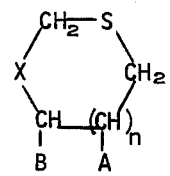

wherein A, B, X and n are as defined above and (II) an anhydrous lower hydrocarbon carboxylic acid.

18. A compound of the formula:

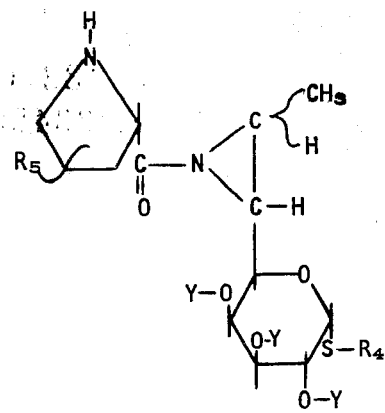

wherein $R_4$ and $R_5$ are each lower alkyl and Y is selected from hydrogen and carboxyacyl of from 2 to 18 carbon atoms, inclusive.

19. A compound according to claim 18 which is methyl N-[trans-4-propyl-L-prolyl]-6(R),7(R)-aziridino-6-deamino-7-deoxy-α-thiolincosaminide.

20. a compound according to claim 2 which is methyl N-(1-carbobenzoxy-trans-4-propyl-L-prolyl)-7-deoxy-7(S)-(2-acetoxymethoxy)-ethylthio-α-thiolincosaminide.

21. A compound according to claim 9 which is methyl N-(1-methyl-trans-4-propyl-L-prolyl)-6(R),7(R)-aziridino-6-deamino-7-deoxy-α-thiolincosaminide.

* * * * *